Nov. 8, 1927.
F. T. COURT ET AL
1,648,639
TRACTOR DRAWN CULTIVATOR
Filed June 1, 1926
2 Sheets-Sheet 1
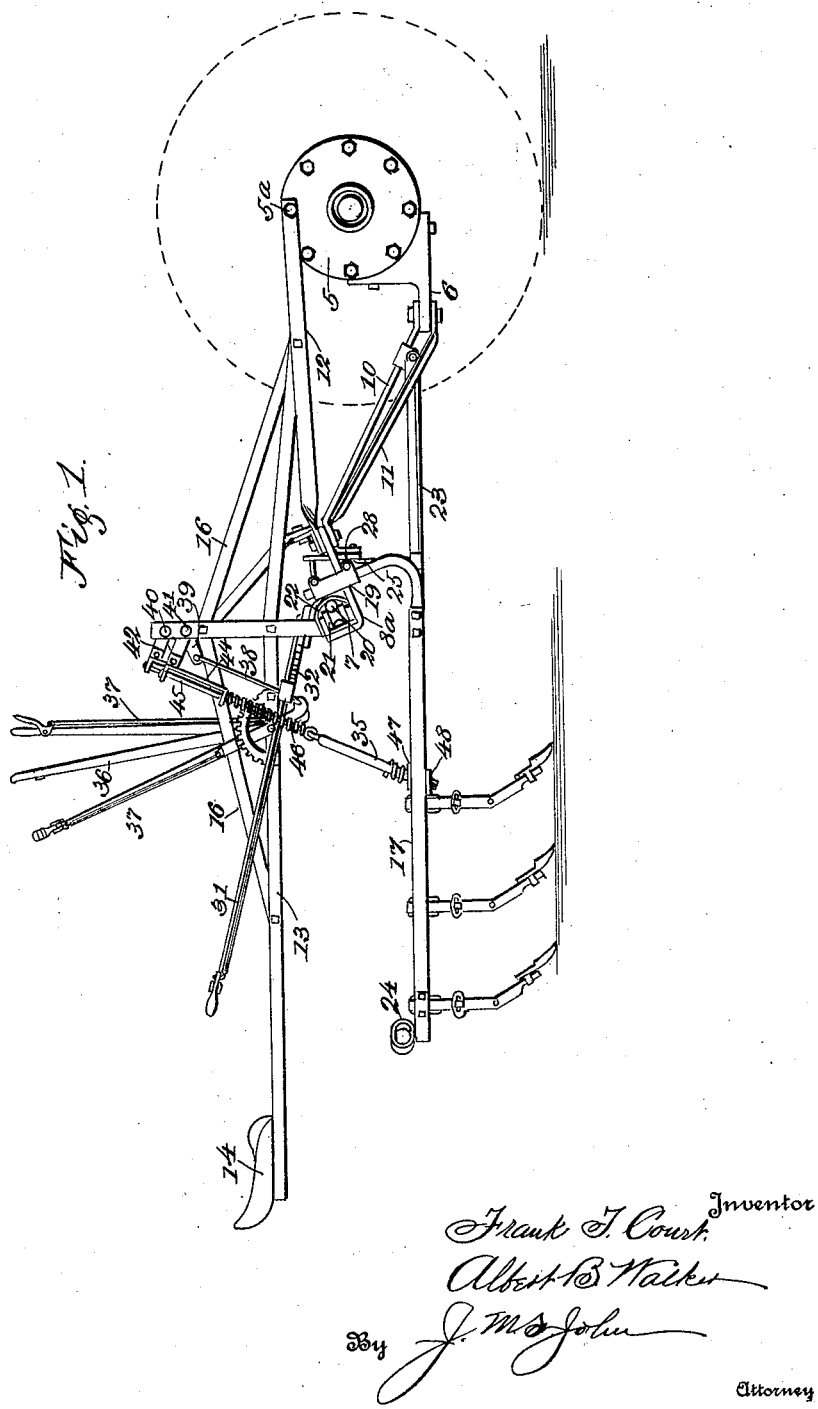

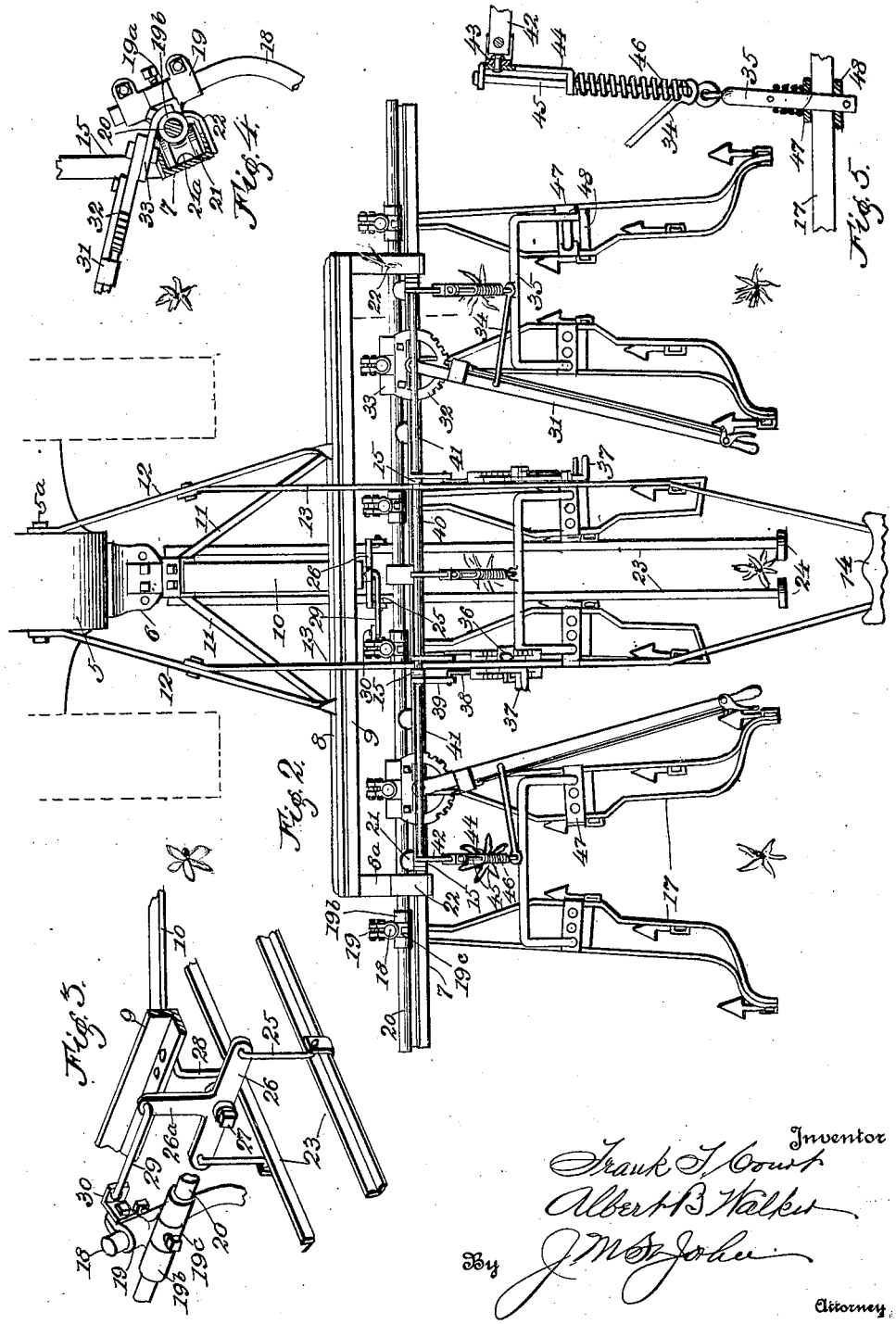

Patented Nov. 8, 1927.

1,648,639

UNITED STATES PATENT OFFICE.

FRANK T. COURT, OF INDEPENDENCE, AND ALBERT B. WALKER, OF CEDAR RAPIDS, IOWA.

TRACTOR-DRAWN CULTIVATOR.

Application filed June 1, 1926. Serial No. 112,761.

This invention relates to tractor-drawn cultivators, and the object of the invention is to provide mechanism attachable to a tractor whereby three rows of corn may be cultivated at once, the whole area embraced by the cultivators being under the direct observation of the operator.

A further object of the invention is to provide for all the adjustments and movements of all parts of the apparatus as may be required in multi-row cultivation. These include lateral shifts to adjust the cultivators to varying widths of corn-rows; free and independent movements of the cultivator gangs, within certain limits; lateral swinging of the straddle-row gangs on their front end pivots, separately or concurrently, means for shifting the entire series of gangs laterally, with the gangs trailing, and means for shifting one or more of the coupled gangs sidewise bodily, fore and aft, without the trailing action above mentioned.

The invention is fully disclosed in the description and claims following, reference being had to the accompanying drawings, in which:—

Fig. 1 is a side elevation of a cultivator embodying the invention. Fig. 2 is a plan view of the same. Fig. 3 shows in perspective details of the mechanism for shifting the cultivator gangs laterally at the front ends. Fig. 4 shows a part of the cultivator mounting and shifting apparatus to the left of the section line 4—4 of Fig. 2, looking toward the left. Fig. 5 is an elevation showing details of the mechanism for lifting and depressing the coupled gangs.

The apparatus herein shown is specially adapted for connection with a well-known tractor, of which a portion of the rear axle housing 5 is shown, together with the draft extension 6, the rear wheels being indicated by dotted lines.

The entire cultivator, with its supporting frame, controls and operator's seat is supported by the tractor at the proper height, thus dispensing with cultivator wheels altogether. The primary support for the cultivators at the front end is a channel-bar 7 (and its connection, which will be described presently) and a parallel bar 8 disposed in front thereof, and rigidly attached thereto by rearwardly extending arms 8$^a$. To the bar 8, referred to hereafter as the yoke-bar, is bolted a reinforcing angle-bar 9. These are disposed at an incline to the horizontal, as shown in Fig. 1, so that the draft of the cultivators will be at practically the same angle, for a special reason that will be explained presently.

The yoke-bar is connected with the tractor draw-plate by a flat bar 10 and by diagonal brace-bars 11. Another pair of braces 12, nearly horizontal, connect the yoke-bar with the upper part of the tractor differential housing at 5$^a$. This forms a triangularly braced truss holding the draft assembly for the cultivators rigidly in position, both vertically and horizontally. From the braces 12 a pair of bars 13 extend rearwardly, and carry the operator's seat 14 at the rear ends. A pair of uprights 15 rise from the channel-bar and serve as intermediate supports for the seat-bars. For additional stiffness the seat supports are preferably reinforced by braces 16, trussing said supports.

The cultivator gangs 17 are of a familiar type, and by means of goose-necks 18 connect pivotally at their front ends with bearings 19, which are also of well-known construction, and fitted with adjustable collars 19$^a$, whereby the height of the gangs may be regulated, and still allow a limited pivotal motion. These bearings connect (in practice adjustably, but shown conventionally herein) with horizontal bearings 19$^b$ provided with similar adjusting collars 19$^c$. These are attached at spaced intervals to a cylindrical draft-rod 20. Between this draft-rod and the interior of the channel-bar are disposed freely moving rollers 21, hollowed at 21$^a$ to partially embrace the draft-rod. The larger portion of the rollers run in the trough of the channel-bar, as best shown in Fig. 4. The draft-bar is held against displacement by stirrups 22, which, however, have no frictional contact with the draft-bar while the cultivator is in use.

As will be evident, this construction permits endwise movement of the draft-bar, and with it the front ends of all the connected cultivator gangs, whenever in the operation of the cultivator such a movement is desirable or necessary. In practice it is often quite as desirable to shift the gangs laterally at the front ends, as at the rear, to insure clean and thorough cultivation, without uprooting of the plants.

Provision is made for this lateral shift by the feet of the operator. A pair of long foot-levers 23 is pivoted at 23a, and extends back to points accessible by the feet of the operator, where it is provided with foot-holding stirrups 24. Each lever connects by a link 25 (Fig. 3) with an arm of a lever 26 pivoted at 27 to a hanger 28. The lever 26 is of the T or double bell-crank type, and its upstanding arm 26a connects by a link 29 with a bracket 30 secured to one of the draft-rod bearings. It will be evident that depressing the right lever will shift the draft-bar to the right, and vice versa. The operation is made very easy by virtue of the length of the foot-levers, and the freedom with which the draft-rod may move as carried by the anti-friction rollers.

In practice the middle pair of gangs need little lateral shifting excepting what may be done by the feet. It is necessary, however, to be able to shift the outer gangs, and independently, as three corn-rows can never be depended upon to be all equally spaced and parallel. This shifting is effected by the use of hand-levers 31 pivoted to sectors 32 secured to draft-bar bearings by bracket-plates 33. Links 34 connect the levers with the cultivator arches 35.

It will be evident that the shifting of either lever to the right will carry the pair of gangs in the same direction, and vice versa, and both simultaneously by the use of both levers. It is to be noted further that with the levers locked, as shown in Fig. 2, the foot-lever shift will move both pairs of gangs stiffly to the right or left, with no pivotal action of the gangs except such as may be due to lost motion. This in practice is at time very convenient and desirable, the gangs being thrown to the right or left bodily and very quickly. Whenever it may be desired to depend wholly on the foot-shift, allowing the gangs to trail, the hand-levers may be unlocked from the sectors (as by tying the trip-handles) when the positive shifting of the gangs is entirely at their front ends.

The lift and depression of the gangs is controlled by hand-levers 36 and 37, the former controlling the middle pair and the latter the outer ones. These levers connect by links 38 with crank-arms 39 secured to rock-shafts 40 and 41, journaled in the uprights 15. Other cranks 42 connect by swiveled stirrups 43 with guides 44, which carry slide-rods 45 linked at their lower ends to the arches. The slide rods are headed at their upper ends, so that the lift of the guides will lift the gangs, and are provided with coiled compression springs 46 disposed between the guides and the arches, whereby the gangs may be forced to working position and held there elastically.

It will be noted that the lower ends of the arches pass through holes in the top cross-plates 47, and thereby the spacing of the gangs may be varied. A lower cross-plate 48 is slotted transversely of the gang, and receives the leg of the arch. The two plates serve to hold the arch in alignment with the compression spring and its connections, while the slot allows for the twisting action of the gangs on the arch as one or the other rises and falls in its work.

The frame which supports the draft assembly, seat and operating levers is essentially a cantilever frame, and for the sake of brevity, as well as definiteness, will be so referred to in the claims.

The cultivator as thus described is adapted for the thorough, convenient and very rapid cultivation of corn, or other crops planted in similar rows, during practically the entire cultivating period. In the intervals the tractor may be used for other purposes by the removal of the four connecting bolts.

Having thus described our invention, we claim:—

1. In combination with a tractor and gangs of cultivators, a draft-rod to which the gangs are attached transversely, a support for the draft-rod carrying draft-rod rollers, a frame connecting the draft-rod support rigidly with the rear of the tractor, and mechanism connecting the rigid structure and said draft-rod whereby the operator may shift the draft-rod and its connections laterally.

2. In a tractor-drawn cultivator, a mounting for cultivator gangs, comprising a draft-rod to which the gangs are transversely attached, a support along which the draft-rod is slidable, disconnected rollers interposed between the draft-rod and said support, and means for shifting the draft-rod endwise.

3. In a tractor-drawn cultivator, a mounting for cultivator gangs, comprising a cylindrical draft-rod to which the gangs are transversely attached, a support along which the draft-rod is slidable, disconnected interposed rollers, grooved to partially admit the draft-rod, and means for shifting the draft-rod endwise.

4. In a tractor-drawn cultivator, a mounting for cultivator gangs, comprising a cylindrical draft-rod to which the gangs are transversely attached, a channel-bar along which the draft-rod is slidable, disconnected grooved rollers carried by the channel-bar and partially embracing the draft-rod, stirrups to prevent displacement of the draft-rod, and means for shifting the latter endwise.

5. Mounting and shifting mechanism for a tractor-drawn wheel-less cultivator, comprising a draft-rod to which cultivator gangs are transversely attached, a fixed support along which the draft-rod is slidable endwise, means adapted to shift the draft-rod endwise, a lever carried by the draft-rod, means for locking the same in desired positions, and means connecting said lever with a cultivator gang.

6. In a tractor-drawn wheel-less cultivator, a draft-rod to which the gangs are transversely attached, a fixed support along which the draft-rod is slidable endwise, a frame carrying said fixed support and a driver's seat, foot-levers operable from said seat, and intermediate levers and links connecting the foot-levers with the draft-rod, whereby the depression of a foot-lever shifts the draft-rod laterally.

7. In a tractor-drawn wheel-less cultivator, a draft-rod to which the gangs are transversely and pivotally attached to swing sidewise, a fixed support along which the draft-rod is slidable endwise, a lever carried by the draft-rod and connecting operably with a gang, and an independent lever carried by the supporting structure and connecting operably with the draft-rod, whereby the gangs may be shifted at the front, or rear, or both.

8. In a tractor-drawn cultivator, a draft assembly, a cantilever supporting frame therefor, cranked rock-shafts, co-operating hand-levers, lifting and depressing means connecting said rock-shafts with gang-arches, cultivator gangs with pierced cross-plates, arches with legs slidable through said plates, and means adapted to hold the arches in vertical alignment with the lifting means while permitting a transverse rocking movement of the gangs.

In testimony whereof we affix our signatures.

FRANK T. COURT.
ALBERT B. WALKER.